F. C. STOFFER AND P. YOST.
STEERING MECHANISM FOR AUTOMOBILES.
APPLICATION FILED MAR. 5, 1920.
1,355,517.                                                                 Patented Oct. 12, 1920.
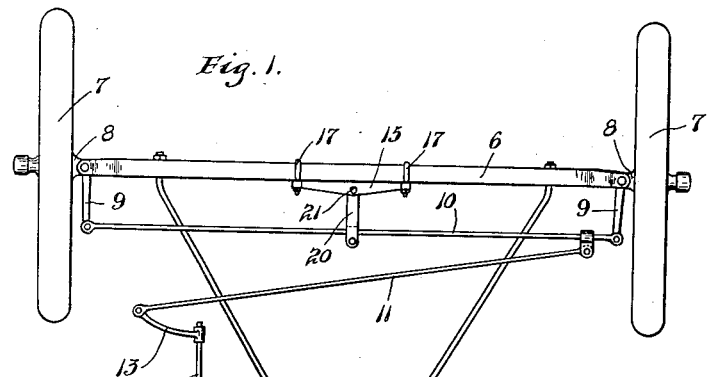
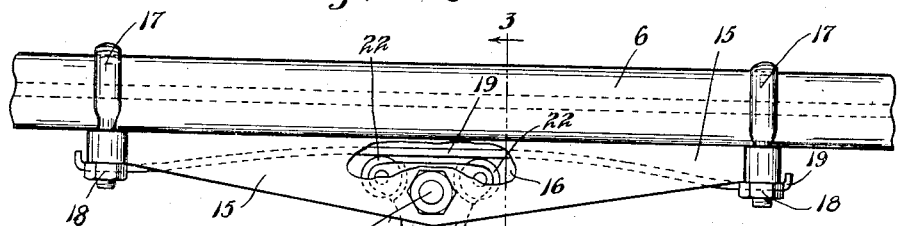
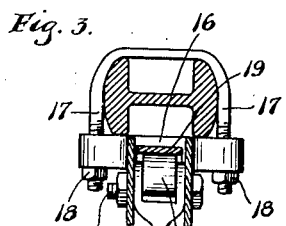
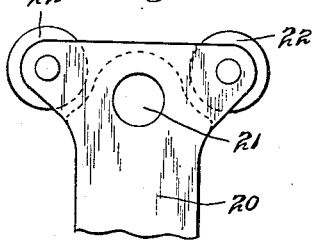
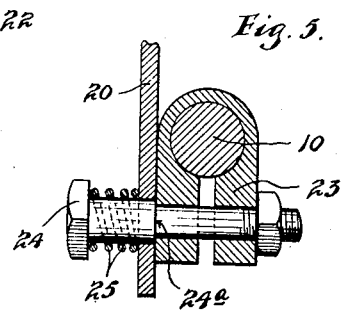
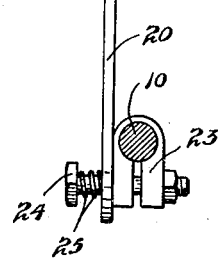
INVENTORS
FRANK C. STOFFER.
PETER YOST.
BY THEIR ATTORNEYS.

UNITED STATES PATENT OFFICE.

FRANK C. STOFFER AND PETER YOST, OF MINNEAPOLIS, MINNESOTA.

STEERING MECHANISM FOR AUTOMOBILES.

1,355,517. Specification of Letters Patent. Patented Oct. 12, 1920.

Application filed March 5, 1920. Serial No. 363,396.

*To all whom it may concern:*

Be it known that we, FRANK C. STOFFER and PETER YOST, citizens of the United States, residing at Minneapolis, in the county of Hennepin and State of Minnesota, have invented certain new and useful Improvements in Steering Mechanism for Automobiles; and we do hereby declare the following to be a full, clear, and exact description of the invention, such as will enable others skilled in the art to which it appertains to make and use the same.

Our invention relates particularly to steering mechanism for automobiles employing steering mechanism in which the steering wheel is very sensitive to force applied to the front wheels of the machine, and has for its object to provide a simple and highly efficient stabilizer, which acts with a yielding force, tending to hold the front wheels for straight ahead travel.

Generally stated, the invention consists of the novel devices and combination of devices hereinafter described and defined in the claim.

The improved stabilizer is of simple construction and is adapted to be quickly and easily applied as a yielding connection between the front axle and the cross-rod of the steering mechanism. The improved stabilizer in its preferred form is illustrated in the accompanying drawings, wherein like characters indicate like parts throughout the several views.

Referring to the drawings:

Figure 1 is a plan view showing the front axle, the front wheels and parts of the steering connections and illustrating our improved stabilizer applied to a Ford car;

Fig. 2 is a plan view of the stabilizer showing also portions of the front axle and of the cross-rod of the steering mechanism;

Fig. 3 is a section taken approximately on the line 3—3 of Fig. 2;

Fig. 4 is a plan view showing the front end of the portion of the lever of the so-called centering lever of the stabilizer; and Fig. 5 is a detail in section on the line 5—5 of Fig. 2.

Of the parts of the regular Ford equipment, in so far as they are shown in the drawings, the numeral 6 indicates the front axle, the numeral 7 the front wheels, the numeral 8 the pivoted stub axles having arms 9, the numeral 10 the cross-rod, the numeral 11 the connecting rod, the numeral 12 the steering post shaft, the numeral 13 an arm on the lower end of shaft 12 that is attached to the connecting rod 11 in a customary way and the numeral 14 indicates the front axle radius-rod. All of the parts just noted are of standard Ford construction.

Of the parts of the stabilizer, the numeral 15 indicates a bearing frame bar, preferably a cast structure, solid at its ends, but bifurcated nearly from end to end so as to afford vertically spaced webs with a long slot 16 therebetween.

The numeral 17 indicates U-bolts that embrace the front axle 6 and the threaded ends of which are passed through bolt holes in the ends of frame bar 15 and are provided with nuts 18 for coöperation with said U-bolts to rigidly but detachably secure said frame bar to the front axle.

The numeral 19 indicates a flat leaf spring, the ends of which are seated against the ends of the frame bar 15 and the intermediate portion of which works freely in the slot 16.

The numeral 20 indicates a so-called centering lever, which, at its front end, works in the central portion of the slot 16 and is pivotally connected to the upper and lower webs of the bar 15, by a nut equipped bolt 21, said lever 20 at its front end, on opposite sides of its pivot 21, is provided with bearing surfaces or points that directly engage the intermediate portions of the spring 19, and preferably, as shown, these bearing points are afforded by small rollers 22, journaled to oppositely projecting lugs on the front end of the lever 20.

The numeral 23 indicates a pronged or split clamping head that embraces the central portion of the cross-rod 10 and is detachably but rigidly secured thereto by a nut-equipped bolt 24.

This bolt 24, at a considerable distance from its head, is provided with a shoulder 24$^a$, which together with the nut on said bolt, is adapted to tightly draw the prongs of the head 23 toward each other and thereby frictionally and adjustably clamp said head on the cross-rod 10. The rear end of the lever 20 is pivoted on the projecting portion of the bolt 24, and to prevent rattling, a coil spring 25 is placed on said bolt and compressed between its head and the rear end of said lever 20.

With the arrangement described, it is evident that the tension of the spring 19 will normally cause the spring to press against both of the rollers 22 and thereby hold the lever 20 in its central position, as shown by full lines in Figs. 1 and 2; and this obviously, will yieldingly hold the front wheels 7 for straight ahead travel of the machine. Nevertheless, the machine can be easily steered in the usual way, since the spring 19 will yield and permit the lever 20 to move either toward the right or left, as required to produce the steering action in turning curves or following an irregular road.

When the stabilizer is applied, it is not necessary to always hold the steering wheel tightly gripped in the hand, because the stabilizer tends to prevent accidental movements of the steering connections when one of the front wheels strikes a rock, rut, or the like and even if some such movement should take place, the stabilizer will quickly bring the steering connections back to position for straight ahead travel of the machine. The long leaf spring 19 affords the desired tension for producing the stabilizing action and at the same time this long spring will not greatly change its tension under the steering action.

Obviously, while the device is of simple construction, it may be easily installed and is highly efficient for the purposes had in view.

From the above description, it is evident that the improved device not only affords comfort in safe riding, but protects in an emergency in case the steering mechanism gets out of order. It also controls the front wheels so that they will not jack-knife and keeps the same in proper alinement on sandy, rough and muddy roads. The device also reduces car wear, strains and torsion on the running gear, car frame and body, and relieves strain on the steering arms and the entire steering mechanism, as well as strains on the arms of the driver, due to road shocks and jarring of the steering gear when running on rough and muddy roads.

What we claim is:

In an automobile, the combination with a front axle and cross rod of the steering connections of a bearing bar detachably secured to said axle and provided with a slot extended nearly from end to end thereof, a leaf spring seated at its ends on the ends of said frame bar and working in the slot thereof, a centering lever pivoted to the intermediate portion of said frame bar and having at its pivoted end a head that works in said slot and provided with bearing points on opposite sides of its pivot that are normally seated against the intermediate portion of the spring, said points being afforded by rollers journaled to said head, the extended end of said lever being pivotally connected to said cross rod.

In testimony whereof we affix our signatures in presence of two witnesses.

FRANK C. STOFFER.
PETER YOST.

Witnesses:
WINIFRED I. WARD,
HARRY D. KILGORE.